United States Patent [19]

Bacrania

[11] 4,380,033

[45] Apr. 12, 1983

[54] DISC-DRIVE HEAD POSITIONING SYSTEMS

[75] Inventor: Kantilal Bacrania, Stevenage, England

[73] Assignee: Burroughs Corporation, Detroit, Mich.

[21] Appl. No.: 170,334

[22] Filed: Jul. 21, 1980

[30] Foreign Application Priority Data

Jul. 19, 1979 [GB] United Kingdom ............... 7925197

[51] Int. Cl.³ .......................... G11B 3/10; G11B 5/58; G05B 15/02
[52] U.S. Cl. .................................... 360/77; 364/183; 364/559; 364/734
[58] Field of Search ................. 364/559, 183; 360/77, 360/78

[56] References Cited

U.S. PATENT DOCUMENTS

| 3,691,543 | 9/1972 | Mueller | 360/77 |
| 4,074,328 | 2/1978 | Hardwick | 360/77 |
| 4,085,427 | 4/1978 | Dunn | 360/77 |
| 4,149,199 | 4/1979 | Chick et al. | 360/77 |
| 4,188,646 | 2/1980 | Sordello et al. | 360/77 |

FOREIGN PATENT DOCUMENTS 2364784  7/1975  Fed. Rep. of Germany ........ 360/77

*Primary Examiner*—Felix D. Gruber

*Attorney, Agent, or Firm*—David G. Rasmussen; Kevin R. Peterson; Edmund M. Chung

[57] ABSTRACT

A servo system uses a position demand signal to drive a servo to position a transducer head over a specific track on a disc. The position demand signal is referenced to a tribit servo track on the disc. A tribit servo track demodulator circuit, similar to that taught by Mueller in U.S. Pat. No. 3,691,543, is used to compute a correction signal to be applied to the position demand signals used in the servo system. In the demodulator circuit (similar to the Mueller reference), first and second position indicating signals from the tribit servo track are processed on two parallel detection paths to compute an error signal. The invention improves the process by computing a first correction position demand signal from the error signal to position the transducer head over a null point proximate to the tribit servo track, and then switching the demodulator paths so the two position indicating signals are processed on the reverse demodulator paths to compute a second correction position demand signal to again position the transducer head over a second point where the transducer finds a null point proximate to the tribit servo track. The mean value of the first and second correction position demand signals is then computed and used in the servo system as a correction signal to be applied to position demand signals for movement of the head to other tracks on the disc. The mean value compensates for offset errors in the detection paths in establishing the tribit servo track location as a reference location.

8 Claims, 7 Drawing Figures

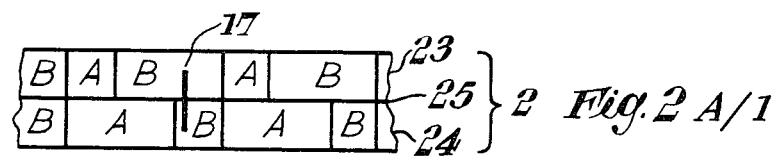
Fig. 2 A/1
Fig. 2 A/2
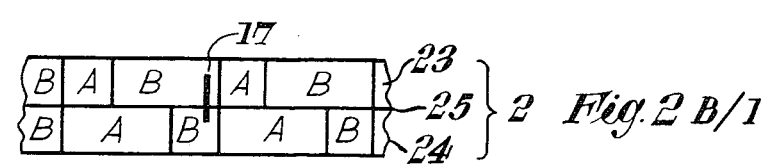
Fig. 2 B/1
Fig. 2 B/2
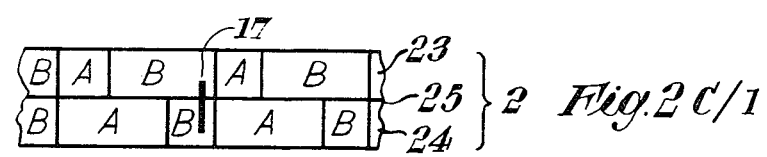
Fig. 2 C/1
Fig. 2 C/2

DISC-DRIVE HEAD POSITIONING SYSTEMS

BACKGROUND OF THE INVENTION

1. Field of the Invention

The present invention relates to a method and apparatus for placing a transducer over a selected track on a moving disc. More particularly, the invention relates to computation of a correction signal to improve the accuracy of a position demand signal for moving the transducer to a selected track.

2. Prior Art

The use of servo tracks, recorded on moving discs, recovered from the disc by a transducer, and having been recovered, being decoded to give indication of the positional deviation of the transducer from a central position, is well known as a method for finding specific locations or benchmarks on the moving disc, and thereby, reducing the positional errors encountered in the placing of a head over the disc, or in bringing the disc itself into some registration. The method has been used to position reading and writing transducers over other moving media also. U.S. Pat. No. 3,691,543 to Mueller shows such a system.

The particular physical embodiment of the servo track, employed in any particular device, depends on the application, and ranges from dedicated tracks, containing nothing except positional information, to signal storage tracks, having servo information interspersed among the stored signals. Another embodiment of a servo track is the use of the signal storage track itself to provide servo information where means are provided to interpret the signals.

The particular form of the readback signal from the servo track may also be one of many varieties. One example is the sophisticated, two-element so called "tribit" tracks as taught by Mueller in aforementioned U.S. Pat. No. 3,691,543.

All servo track systems have the commonality that their operation requires the provision, at the output of the transducer, of two, separable position indicating signals, retrieved from the moving media (e.g. disc). The signals are designed to show differences, from one another, whenever the transducer is not in the null position. The difference may be in amplitude, relative timing, or both. In every case, the reduction of the designated differences to zero is indicative of the transducer being at the central (or null) position of interaction with the servo track. To bring the transducer to this position, whether by moving the transducer or moving the disc, is to have found a benchmark on the disc. The precise knowledge of one positional point allows for similarly precise knowledge of the whereabouts of other points on the disc.

In order to use the servo information, derived from the servo track, it is necessary to provide a demodulator for interpreting the signals from the media, to provide indication of the displacement of the transducer from the null position. There is a different style of demodulator for every kind of servo track.

No matter what the specie of servo track, in every demodulating system the two, separable signals, derived from the media by the transducer, must be balanced in order to find the null position.

It is generally true that, in order to find the difference between any two quantities, it is necessary, in effect, to perform two measurements. The difference between the two measurements is then taken. The two measurements, which, generally, involve the production of a representation of each of the two quantities to be compared, may be made simultaneously, through two separate channels, or one after the other through the same channel.

Servo track demodulators operate, in nearly every case, by the simultaneous, rather than the time sequential measurement of both position indicating signals. Such simultaneous measurement of two quantities presents problems in the calibration, balance and relative offsets encountered between the two, nominally identical, measuring channels required to perform the comparison operation.

It is possible to achieve great precision in the location of the transducer's null position, on a servo track, by constructing demodulators of extreme accuracy in themselves. There are always problems however, in maintaining thermal, and lifetime stability in the two measuring channels. No matter how well the demodulator is first built, changes can and do appear with time and environment. Problems arise in the mutual calibration, balance and offsets between the two channels.

Other problems arise in the manufacture, on a large-scale basis, of such precision devices whereby component tolerances conspire to render the balance between the channels unacceptably poor, necessitate the inclusion, of manually adjustable elements for later set up and test.

The aforementioned Mueller patent has these deficiencies. The Mueller system contains a disc with a servo track, a transducer for picking up two position indication signals from the servo track, a servo for positioning the transducer, and a feedback circuit with a two channel demodulator for separating the two position indicating signals, comparing them, and providing a signal as the feedback signal to the servo. As the transducer approaches and crosses the servo track, the position indicating signals change these, changing the comparator signal which changes the servo signal.

It is therefore desirable to provide means whereby a positional measurement precision, of the servo track system, may be made largely independent of the precision of the demodulator. It is also desirable to provide means allowing for greater position finding precision in those systems employing conventional servo track demodulators. In particular, it is desirable to provide means whereby a system, employing a poorly balanced demodulator, may be made to function at least as well as a system employing a precision demodulator.

SUMMARY OF THE INVENTION

The present invention provides such a system and is an improvement over the basic disc drive head positioning system taught by Mueller. The system is significantly different than Mueller but uses much of the same tribit servo circuitry. More specifically, the present invention does not use a continuous closed loop feedback system to position the transducer head, as in Mueller. Instead, it uses a servo system where the desired position for the transducer head is stored in a disc file operating system (7 in FIG. 1), and fed directly to the servo to move the transducer head. The position demand signal in the disc file operating system must be referenced to a point on the disc. This point is the tribit servo track. The value of the tribit servo track is stored in the disc file operating system. However, it may not be accurate. This is where the tribit servo circuitry similar to that of Mueller comes in. A tribit servo feedback system, simlar to that of Mueller but with important differences, is used to compute a correction signal reflecting the differences between the value of the servo track signal in the disc file operating system and the value the head actually sees on the disc. This correction factor is then applied to all of the signals the disc file operating system feeds to the servo system to move the head. The correction factor is only computed once (or with a change of environment) and stored in the disc file. This is in contrast to the Mueller circuit which is an integral part of a continuous feedback circuit to position the head. In summary, Mueller decodes the tribit servo signal to create a feedback which directly positions the heads. Applicant's invention uses the tribit servo signal to create a correction signal which is applied to the disc file operating system to correct signals (i.e. position demand signals) sent to a servo to move the heads.

The inventive feature of applicant's invention lies in the difference in the tribit servo track circuit that it uses to compute the correction signal and the Mueller tribit servo circuit used to position the head. Applicant uses the basic circuit of Mueller, described previously, but improves it by adding control logic and a controller (6, 8 in FIG. 1) to provide a circuit which computes applicant's desired correction signal.

More specifically, as in the prior art, applicant's demulator uses two detection paths to compare the two position indicating signals to produce an error signal. In the improvement, the error signal is fed to a controller which produces a first correction position demand signal to be fed to a servo to move the head. At a point proximate to the tribit servo track a null is found. Ideally the null is directly over the tribit servo track but errors will cause the null point to be offset from the tribit servo track. The correction position demand signal is stored. Next the controller and control logic cooperate to reverse the two detection paths to receive the opposite position indicating signals. The two position indicating signals will be compared again and generate a new error signal and second correction position demand signal. The head will again move until a null is reached. At this point the values of the first and second correction position demand signals for the position indicating signals in the original and reversed position will be compared and a mean value computed. This mean value is fed to the disc file operating system to be stored and used as a correction signal. The controller, control logic, and demodulator have completed their work and provided the correction signal. They become inactive and the disc file operating system now controls the head position.

BRIEF DESCRIPTION OF THE DRAWINGS

FIG. 2 shows, in FIGS. 2A/1, 2B/1, and 2C/1, a so called "Tribit" servo track used in the preferred embodiment of FIG. 1 and in FIGS. 2A/2, 2B/2, and 2C/2, the signals recovered from the tribit track by the head.

DESCRIPTION OF THE PREFERRED EMBODIMENT

Figure 1:
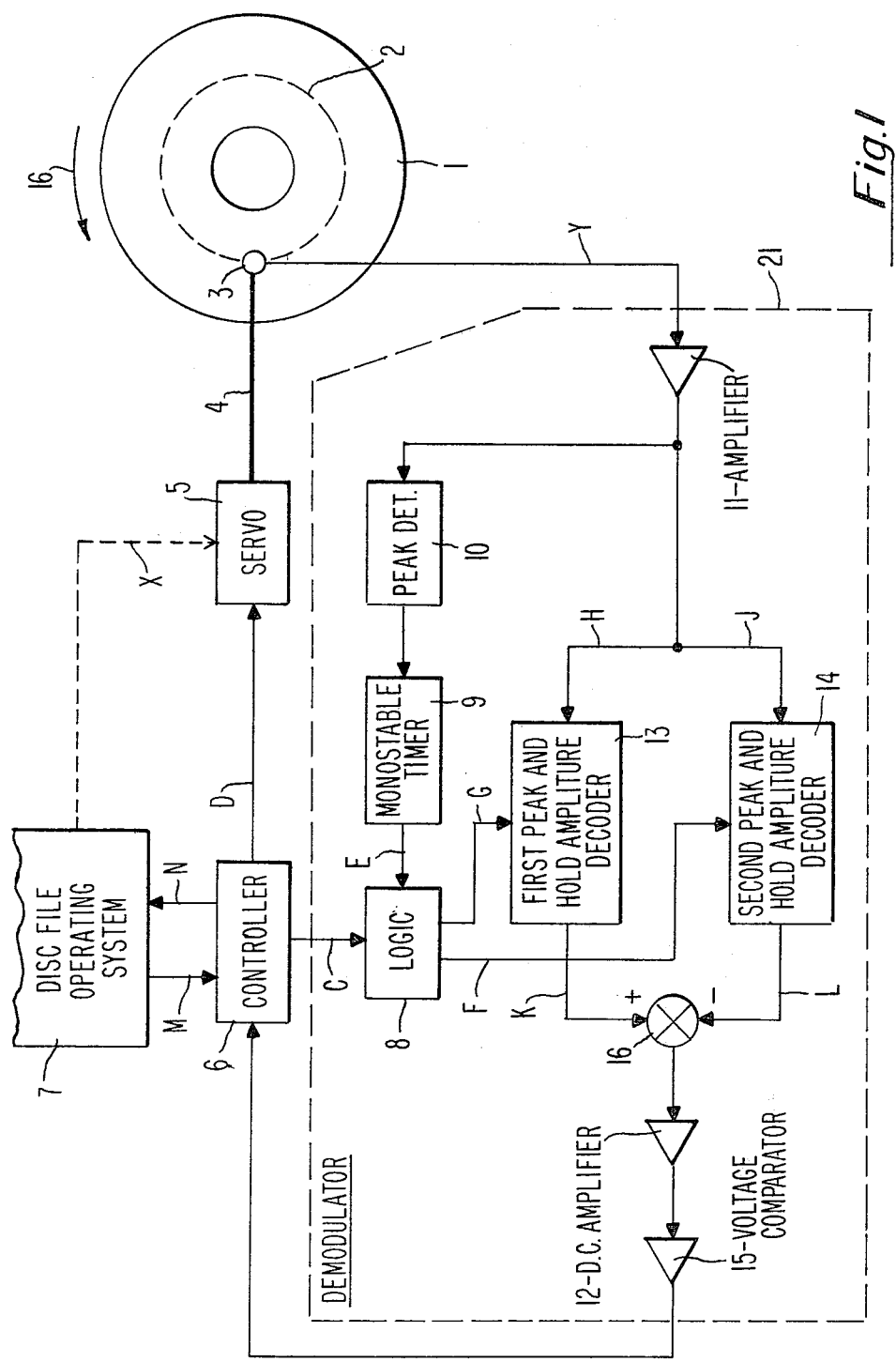
FIG. 1 shows a schematic diagram of the preferred embodiment of the present invention.

Attention is first drawn to FIG. 1, showing, in schematic form, the system and members of the preferred embodiment of the present invention. This circuit is similar to that shown in U.S. Pat. No. 3,691,543 to Mueller except that the logic of Block 8 has been added together with associated controller 6.

A magnetic disc (1), for the storage of retrievable, informal data on a plurality of concentric, data storage tracks, and rotating as indicated by the arrow (16), also has, recorded on it, a circular servo track (2) of the so called 'Tribit' variety, as taught by Meuller. The servo track (2) is concentric with that data storage tracks. Signals, recorded on the disc (1), whether servo information or data, are accessed and recovered by means of a radially positionable magnetic head (3) being placed at selectable radii, on the disc (1), adjacent to the recording radius of the signals it is required to retrieve by a head positioning servomechanism (5), mechanically coupled to the head (3) via a mechanical coupling (4). The head (3) provides, as its output, on the coupling indicated by Y, an analog representation of signals, recorded on the disc (1).

The servomechanism (5), is provided with two inputs, a first input, on the coupling indicated by D, from a controller (6) and a second input, on the coupling indicated by X, from the disc file operating system (7). The disc file operating system (7) attends to the normal, functional control of the disc file. The position controlling servomechanism (5) is linearly responsive, in its radial positioning of the head (3), on the disc (1), to each of its inputs (D or X), altering the radius of the head (3) on the disc (1) by equal amounts for equal increments in the signals on its input couplings.

During the operation of the present invention to compute the mean value of the position demand signal for the servo track, the disc file operating system (7) does not send any signals to the servomechanism (5). The radial position of the head (3) comes entirely under the control of the controller (6). This changeover of controls is indicated to the controller (6) by signals to the controller (6), from the disc file operating system (7), via the coupling indicated by M. During the time that the present invention is non operational, the controller (6) sends no signals to the servomechanism (5). In this way, one or other, but not both, of the controller (6) or the disc file operating system (7), dictate the radial position of the head (3) on the disc (1).

The output of the head (3) is coupled, as an input to demodulator 21 and more specifically, to a signal amplifier (11) whose output, an amplified representation of the signals recovered from the disc (1), is in turn, simultaneously coupled, as an input, to a peak detector (10), a first peak-and-hold amplitude circuit (13), and a second peak-and-hold amplitude circuit (14).

The peak detector (10) provides, as its output, a short pulse, occurring at the positive maximum value of its input waveform. The output of the peak detector is coupled, as a triggering input, to a timeout generator (9). The timeout generator (9) has an output which is normally logical false, but which switches to logical true for a fixed period after triggering has occurred at its input. The output of the timeout generator (9) is coupled, as a controlled input, to controlling logic (8). The controlling logic has, a controlling input, from the controller (6), on the connector by C. The controlling logic 8 provides two outputs, a first output to the first peak-and-hold amplitude decoder circuit (13), and a second output to the second peak-and-hold amplitude decoder circuit (14), on the couplings indicated by G and F respectively. The latter two peak-and-hold circuits are two decoder paths.

The function of the controlling logic (8) is described by the following two expressions. With the letters in the expressions indicating the logical conditions of the signals on the couplings indicated by that letter, the logical expression of the function of the controlling logis is:

$$F = C\overline{E} + \overline{C}E \text{ and } G = CE + \overline{CE}$$

It is seen from the expression that the controlling logic (8), dependent on the state of the controlling input (C), couples, in a selectably reversible manner, either the output of the timeout generator, (9) or its inverse, one to each of the controlling inputs of the first and second peak-and-hold amplitude decoder circuits (13 and 14).

The peak-and-hold function of the peak-and-hold amplitude decoder circuits (13 and 14), is operational whenever their respective controlling inputs are logically true. The outputs of the peak-and-hold amplitude decoder circuits (13 and 14) are a representation of the peak value of their inputs during the last period when their enabling inputs (F and G) were true.

The period for which the timeout generator (9) provides a logically true output, initiated by the occurrence of a peak, positive signal on the output of the signal amplifier (11), is such that one of the peak-and-hold circuits is operational for half the time between positive peaks, and the other peak-and-hold circuit is operational for the other half of the time between positive peaks.

Attention is next drawn to FIG. 2A/1, showing a radial portion of the servo track (2) similar to that shown in Mueller. The servo track (2) comprises two subtracks (23 and 24), contiguously recorded along a circular median line (25). The areas marked A have an opposite polarity of magnetisation to those marked B. Whenever an area in the A polarisation, passing beneath the head gap (17), changes to an area of the B polarisation, the head produces, at its output, at the instant that the boundary between the two areas passes beneath the head gap (17), a short positive pulse. Whenever an area in the B polarisation, passing beneath the head gap (17), changes to an area in the A polarisation, the head produces, at the instant the boundary between the two area passes beneath the head gap (17), a short negative pulse. The amplitude of each pulse is directly proportional to the amount of head gap (17) that each boundary straddles.

The B to A transitions are aligned between the two subtracks (23 and 24). The A to B transitions are staggered between the two subtracks (23 and 24). Each subtrack is at least as wide as the head gap (17). No matter how the head gap (17) is disposed over the median line (25), the aligned B to A transitions straddle the entire head gap (17), and hence produce a positive pulse with amplitude independent of the head position. The amount that the staggered A to B transitions straddle the head gap (17) is a function of the proportional disposition of the head gap (17) across the median line (25). The two, independent negative pulses, produced by the A to B transitions, are thus of an amplitude that varies with the position of the head (3).

Attention is next drawn to the remainder of FIG. 2. FIG. 2A/2 shows the output of the head (3) resultant from the head gap (17) being symetrically disposed across the median line (25). The positive pulse (18) is followed by a first position indicating negative pulse (19), resultant from the A to B transition on the first subtrack (23), and a second position indicating negative pulse (20), resultant from the A to B transition on the second subtrack (24). The first and second position indicating negative pulses (19 and 20) are of equal amplitude.

FIG. 2B/1 shows the physical situation when the head gap (17) is more disposed over the first subtrack (23) than over the second subtrack (24). The resultant waveform, at the output of the head (3) is shown in FIG. 2B/2, where the first position indicating negative pulse (19) had grown in amplitude at the expense of the shrinking in amplitude of the second position indicating negative pulse (20).

FIG. 2C/1 shows the physical situation where the head gap (17) is disposed more over the second subtrack (24) than over the first subtrack (23). The resultant waveform, at the output of the head (3), is shown position indicating in FIG. 2C/2, where the second negative pulse (20) has grown in amplitude at the expense of the shrinking in amplitude of the first position indicating negative pulse (19).

The position of the head gap (17), relative to the median line (25), is thus seen to be reflected by the relative amplitudes of the two position indicating negative pulses (19 and 20). The head gap is symetrically disposed if and only if the two position indicating negative pulses (19 and 20) have the same amplitudes.

The centre of the servo track (2) is defined as that radius, of the head on the disc, where the two position indicating negative pulses (19 and 20) have the same amplitudes.

The action of the output of the timeout generator (9) being the same as the action of Mueller's multivibrator 15, one of the peak-and-hold amplitude decoder circuits 13, 14 respectively is open for the first position indicating negative peak (19) while the other is closed, and the other is open for the second negative peak (20) while the one is closed. In this manner the two peak-and-hold circuits (13 and 14) view exclusively one particular negative peak and not the other. The first and second peak-and-hold amplitude decoder circuits 13, 14 correspond in action to Mueller's peak detector 18, 19 in Mueller's FIG. 6.

The outputs of the two peak-and-hold amplitude decoder circuits (13 and 14) are coupled, as inputs, to a subtraction junction (16). The output of the subtraction junction (16), being a linear representation of the difference between its inputs, is thus a representation of the difference between the amplitudes of the first and second position indicating negative peaks (19 and 20). The output of the subtracting junction (16) is coupled as an input to a D.C. amplifier (12). The junction 16 and the amplifier 12 together operate as and correspond to Mueller's comparator 20, in Mueller's FIG. 6. The output of the D.C. amplifier (12), a scaled representation of its inputs, is coupled as an input to a voltage comparator (15). The voltage comparator (15) has an output which is logically true if its input has a positive polarity, and logically false if its input has a negative polarity.

The logical state of the output of the voltage comparator (15) is thus an indication of which of the two position indicating negative peaks (19 and 20) is greater in amplitude, and hence of the direction of displacement of the head gap (17) away from the symetrically disposed position about the median line (25). The logical state of the output of the voltage comparator (15) changes at the point where the head gap (17) is symetrically disposed.

In operation, the preferred embodiment of the present invention behaves as follows.

Having been initiated by the disc file operating system (7), the controller (6) firstly issues signals to the servomechanism (5) causing the head (3) to be moved to a point roughly in adjacence to the servo track (2). By taking account of the logical state of the output of the voltage comparator (15), the controller (6) next issues further signals on the coupling D to the servomechanism (5) whereby the head gap (17) is brought to the point where the output of the voltage comparator (15) just changes and notes the value of the first correction position demand signal on D.

The controller (6) then changes the logical state of the controlling input to the controlling logic (8) to switch over which one of the peak-and-hold amplitude decoder circuits 13, 14 measures the amplitude of each of the position indicating peaks 19, 20. Thus, whereas the first position indicating negative pulse (19) was previously sensed by the first peak-and-hold amplitude decoder circuit (13), and the second position indicating negative pulse (20) was previously sensed by the second peak-and-hold amplitude decoder circuit (14), the first position indicating negative pulse (19) is now sensed by the second peak-and-hold amplitude decoder circuit (14) and the second position indicating negative pulse (20) is now sensed by the first peak-and-hold amplitude decoder circuit (13), so reversing the measuring paths for the two position indicating negative peaks (19 and 20).

The controller (6) next issues signals on the coupling D (i.e. second correction position demand signal) to the servomechanism (5) to again bring the head gap (17) to that disposition about the median line (25) where the output of the voltage comparator (15) just changes and notes the new value of the second correction position demand signal on the coupling D.

The controller (6) finally calculates the mean between the two noted first and second correction position demand signals on the coupling D required to bring the head gap (17) to the point of change of the output of the voltage comparator (15) with the controlling logic (8) in each of its two states. Under ideal conditions the position demand should be 0 for a null condition over the servo track. However, because of offsets there will be a value for D in each of the two states. Computing the mean between the two values of D will reduce the offset error. The mean value there will indicate the error from the ideal value of 0 and will be used to correct the positional demand signal for all other tracks.

This mean value is communicated to the disc file operating system (7), via the coupling indicated by N, in order that the disc file operating system (7) may subsequently employ it for the correction of its own position demand signals to the servomechanism (5) via the coupling X.

The mean value, so derived, is independent of any offsets occurring between the two measuring paths since the method cancels offsets.

It will be apparent to those, skilled in the art, that servo tracks other than the so called 'Tribit' variety may equally well be employed in the spirit of the present invention.

It will also be apparent that measuring of the amplitudes of the position indicating peaks may be achieved in many other ways.

It will also be apparent that the negative peaks may be positive peaks, and vice versa.

Those skilled in the art will be aware that the controller 6 can be implemented as any kind of state sequence machine inclusively of hard wired and of programmable configurations.

The present invention therefore represents an improvement over the teachings of Mueller in that means 8 are provided for switching over which peak-and-hold amplitude decoder circuit 13, 14 measures which position-indicating peak 19, 20 to make two separate determinations of the null position of the head 3 over the track 2 and compute a mean value of the correction position demand signal for the servo track so as to eliminate offsets in the system.

What I claim is:

1. Apparatus for computing the mean value of a correction position demand signal for a servo track on a moving medium, said mean value to be used for error correction of the position demand signal for other tracks, said position demand signals being applied to a servomechanism to move a transducer to a disposition over a track on said moving medium, said transducer recovering first and second position-indicating signal components from said servo track, comprising:

a controller for communicating with said servomechanism;

control logic communicating with said controller; and a demodulator including first and second amplitude decoders and a comparator, said first and second amplitude decoders communicating with said control logic, said first and second amplitude decoders receiving and detecting said first and second position indicating signals respectively from said transducer, the outputs of said first and second amplitude decoders being coupled to said comparator which provides a nonparity output when said transducer is not proximately disposed over said servo track and a parity output when said transducer is proximately disposed over said servo track, said comparator output coupled to said controller which provides a first correction position demand signal to said servomechanism to move said transducer until said parity is reached in said comparator, said control logic responding to said parity to cause said first and second amplitude decoders to next receive and detect said second and first position indicating signals respectively, and provide outputs to said comparator, said comparator providing an output to said controller to provide a second correction position demand signal to said servomechanism to move said transducer until parity is reached in said comparator, said controller computing the mean value of said first and second correction position demand signals at parity, whereby, said mean value is used to correct the positional demand signals for all other tracks on the medium.

2. Apparatus according to claim 1 in which said control logic couples first and second command signals to said first and second amplitude decoders, said first control signal coupling said first and second position-indicating signals to said first and second amplitude decoders respectively, said second control signal coupling said second and first position indicating signal to said first and second amplitude decoders respectively.

3. Apparatus according to claims 1, or 2 including a disc file operating system communicating with said controller to store said mean value of the correction positional demand signals for said servo track and for applying said mean value to the positional demand signal for other servo tracks.

4. The apparatus of claim 3 in which said disc file operating system, said servomechanism and said transducer, are a servo system coupled to said controller.

5. Apparatus according to claim 4 in which the output of said comparator is a logic state indicative of the parity of the difference between the outputs of said first and second amplitude decoders.

6. An apparatus according to claim 5 wherein said output of said comparator comprises a logic signal in a first state when the difference between the first and second amplitude decoder outputs is in a first sense and in a second state when the difference between the first and second amplitude decoder outputs is in a second sense, said indication of parity being provided by the transition of said logic signal between said first and said second states.

7. An apparatus according to claim 6 wherein said first and second amplitude detectors each comprise a peak-and-hold circuit.

8. An apparatus according to claim 7 where said medium is a magnetic disc and wherein said transducer is a magnetic read/write head.

* * * * *